(12) United States Patent
Ryu et al.

(10) Patent No.: US 8,007,859 B2
(45) Date of Patent: Aug. 30, 2011

(54) MANUFACTURING METHOD OF ELECTROLYTE FILLED CATHODE FOR MOLTEN CARBONATE FUEL CELL

(75) Inventors: Bo Hyun Ryu, Daejeon (KR); Yun Sung Kim, Daejeon (KR); Chang-Sung Jun, Daejeon (KR); Mi Young Shin, Daejeon (KR)

(73) Assignee: Boditechmed Inc., Gangwon-Do (KR)

(*) Notice: Subject to any disclaimer, the term of this patent is extended or adjusted under 35 U.S.C. 154(b) by 786 days.

(21) Appl. No.: 11/617,478

(22) Filed: Dec. 28, 2006

(65) Prior Publication Data
US 2008/0160181 A1    Jul. 3, 2008

(30) Foreign Application Priority Data
Dec. 28, 2006  (KR) .................. 10-2006-0136051

(51) Int. Cl.
B28B 7/38       (2006.01)
(52) U.S. Cl. ........ 427/115; 427/118; 427/183; 427/203; 205/257; 205/264
(58) Field of Classification Search .................. 427/115, 427/118, 183, 203; 429/30; 205/264, 257
See application file for complete search history.

(56) References Cited

U.S. PATENT DOCUMENTS

| 4,233,181 | A | * | 11/1980 | Goller et al. ................. 502/101 |
| 4,755,429 | A | * | 7/1988 | Nickols et al. ................ 428/408 |
| 5,595,832 | A | * | 1/1997 | Tomimatsu et al. ........... 429/16 |
| 6,217,822 | B1 | * | 4/2001 | Borglum ....................... 264/632 |
| 6,864,011 | B2 | * | 3/2005 | Kawahara et al. ............. 429/42 |

FOREIGN PATENT DOCUMENTS

| JP | 58087774 | | 5/1983 |
| JP | 61161670 | | 7/1986 |
| JP | 61248369 | | 11/1986 |
| KR | 100303609 | B1 | 7/2001 |

* cited by examiner

Primary Examiner — Shamim Ahmed
Assistant Examiner — Maki A Angadi
(74) Attorney, Agent, or Firm — Conley Rose, P.C.; J. Robert Brown, Jr.

(57) ABSTRACT

Disclosed herein is a method of manufacturing the electrolyte-filled cathode of a molten carbonate fuel cell. The method includes the steps of a) manufacturing an air electrode through a sintering process; b) dispersing electrolyte powder throughout one surface of the air electrode according to a composition of eutectics; c) attaching the electrolyte powder, uniformly dispersed throughout the one surface of the air electrode, to the air electrode using pressure by pressing the electrolyte powder on the air electrode at a predetermined pressure; and d) filling the air electrode with the electrolyte powder, attached to the air electrode, through heat treatment.

4 Claims, 3 Drawing Sheets

MANUFACTURING METHOD OF ELECTROLYTE FILLED CATHODE FOR MOLTEN CARBONATE FUEL CELL

CROSS-REFERENCE TO RELATED APPLICATIONS

This application is claiming priority of Korean Application No. 10-2006-0136051, filed Dec. 28, 2006, and entitled "Manufacturing Method of Electrolyte Filled Cathode for Molten Carbonate Fuel Cell" and which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The present invention relates generally to a method of filling the air electrode of a molten carbonate fuel cell with electrolytes and, more particularly, to a method of manufacturing the electrolyte-filled air electrode of a molten carbonate fuel cell, which calculates the entire amount of electrolyte required for a unit cell of a fuel cell stack and fills an air electrode with electrolytes in advance without using existing electrolyte plates, so as to prevent variation in the height of the fuel cell stack attributable to the melting of the electrolyte plates and achieve uniform surface pressure balance in pre-processing for the fuel cell stack, in which the unit cells of the molten carbonate fuel cell are stacked one on top of another.

DESCRIPTION OF THE PRIOR ART

A molten carbonate fuel cell is an electrochemical power generation device that generates electricity using a hydrogen oxidation reaction and an oxygen reduction reaction. The chemical formulae for such hydrogen oxidation reaction and oxygen reduction reaction are given below. In the fuel electrode of the fuel cell, hydrogen donates electrons while being oxidized; in the air electrode thereof, oxygen accepts electrons while being reduced.

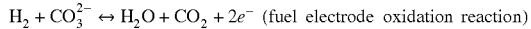

$H_2 + CO_3^{2-} \leftrightarrow H_2O + CO_2 + 2e^-$ (fuel electrode oxidation reaction)

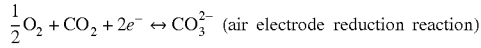

$\frac{1}{2}O_2 + CO_2 + 2e^- \leftrightarrow CO_3^{2-}$ (air electrode reduction reaction)

Referring to FIG. 1, such a typical molten carbonate fuel cell generally includes an air electrode 3, a matrix 5, and a fuel electrode 6. The matrix 5 is generally filled with electrolytes, which promote the flow of ions.

Fuel gas, such as hydrogen, is introduced into the fuel electrode 6, and the hydrogen donates electrons while being oxidized; oxygen or air, including oxygen, is introduced into the air electrode 3 along with carbon dioxide and consumes electrons, donated by the fuel electrode, while producing carbonate ions $CO_3^{2-}$.

The carbonate ions move through the matrix 5 between the fuel electrode 6 and the air electrode 3 from the air electrode 3 to the fuel electrode 6, and the electrons flow through an external circuit connected to the fuel cell. Accordingly, only when, in the molten carbonate fuel cell, electrolytes are appropriately distributed throughout the respective elements, and three-phase boundaries, where three phases of gas, liquid and solid meet each other, are sufficiently generated in the fuel electrode 6 and the air electrode 3, can electricity be effectively produced.

For this reason, the amounts of electrolyte required for the fuel electrode 6 and the air electrode 3 are determined depending on the size and distribution of the minute pores of the fuel electrode 6 and the air electrode 3, which are set by comparing theoretical values based on capillary force with actual values measured in experiments.

In the prior art, electrolyte plates 4 are respectively inserted between the matrix 5 and the fuel electrode 6 and between the matrix 5 and the air electrode 3, and electrolytes are melted through heat treatment and then dispersed throughout respective elements. In this case, when the electrolyte plates 4 are melted through heat treatment at the time of manufacturing a fuel cell stack by stacking several tens or hundreds of unit fuel cells, spaces corresponding to the electrolyte plates 4 are eliminated and, at the same time, the height of the stack is reduced. Furthermore, the electrolyte plates are non-uniformly melted, therefore it is difficult to achieve uniform surface pressure distribution. Moreover, the electrolyte plates are melted and move from the unit cell of the fuel cell, therefore it is difficult to manage the amounts of electrolyte.

Meanwhile, in the prior art method of filling an air electrode with electrolytes, electrolyte slurry is directly applied to the air electrode, is dried and is then heat-treated, or an electrolyte plate is placed on the air electrode and is then heat treated. In this case, a process of performing heat treatment in an oxidizing atmosphere at an temperature (oxygen or air) lower than 450° and reducing the oxidized air electrode in an oxidizing atmosphere higher than 450° is necessary so as to remove organic material from slurry, therefore the continuity of the process of manufacturing a fuel cell is not ensured, with the result that yield is reduced due to the difficulty in removing organic material. Furthermore, after the air electrode has been filled with electrolytes, a twisting phenomenon occurs in a cooling process, therefore the flatness of the air electrode is deteriorated, with the result that the air electrode is not suitable for a fuel cell stack.

SUMMARY

Accordingly, the present invention has been made keeping in mind the above problems occurring in the prior art, and an object of the present invention is to provide a method of manufacturing the electrolyte-filled air electrode of a molten carbonate fuel cell, which calculates the entire amount of electrolyte required for a unit cell of a fuel cell stack and fills an air electrode with electrolytes in advance without using existing electrolyte plates, so as to prevent variation in the height of the fuel cell stack attributable to the melting of the electrolyte plates and achieve uniform surface pressure balance in preprocessing for the fuel cell stack, in which the unit cells of the molten carbonate fuel cell are stacked one on top of another.

In order to accomplish the above object, the present invention provides a method of manufacturing the electrolyte-filled cathode of a molten carbonate fuel cell, including the steps of a) manufacturing an air electrode through a sintering process; b) dispersing electrolyte powder throughout one surface of the air electrode according to a composition of eutectics; c) attaching the electrolyte powder, uniformly dispersed throughout the one surface of the air electrode, to the air electrode using pressure by pressing the electrolyte powder on the air electrode at a predetermined pressure; and d) filling the air electrode with the electrolyte powder, attached to the air electrode, through heat treatment.

The step b) includes the step of b1) securing the air electrode using a graphite support plate, which allows the air electrode to be placed thereon, and a graphite jig, which vertically and continuously extends from two side end portions of the graphite support plate and fastens two side ends of the air electrode, so as to secure the air electrode at a predetermined location and prevent removal of the dispersed electrolytes from the one surface of the air electrode during the dispersion of the electrolyte powder.

The step b) includes the step of b2) dispersing the electrolyte powder through a dispersion apparatus for generating vibrations using a vibrator and uniformly dispersing the electrolyte powder throughout the one surface of the air electrode while moving from one end of the air electrode to another end thereof above the one surface of the air electrode, so as to disperse the electrolyte powder.

The step c) includes the step of c1) pressing the electrolyte powder on the one surface of the air electrode using a pressing roller.

The step c) includes the step of c2) placing a graphite plate having a predetermined weight on the electrolyte powder, dispersed throughout the one surface of the air electrode, so as to apply a predetermined pressure to the electrolyte powder attached to the one surface of the air electrode.

The step d) includes the step of d1) melting the electrolyte powder pressed on the one surface of the air electrode and filling the air electrode with the electrolyte powder, in a reducing atmosphere within a heat treatment furnace at a temperature ranging from 550° to 650°.

The electrolyte powder has a diameter equal to or smaller than 10 µm, and any of a composition of lithium carbonate and potassium carbonate and a composition of lithium carbonate and sodium carbonate.

The air electrode has a thickness equal to or larger than 0.8 mm.

BRIEF DESCRIPTION OF THE DRAWINGS

The above and other objects, features and advantages of the present invention will be more clearly understood from the following detailed description taken in conjunction with the accompanying drawings.

DESCRIPTION OF THE PREFERRED EMBODIMENTS

With reference to the accompanying drawings, the steps of a method of manufacturing the electrolyte-filled cathode of a molten carbonate fuel cell according to an embodiment of the present invention are described in detail.

Figure 2:
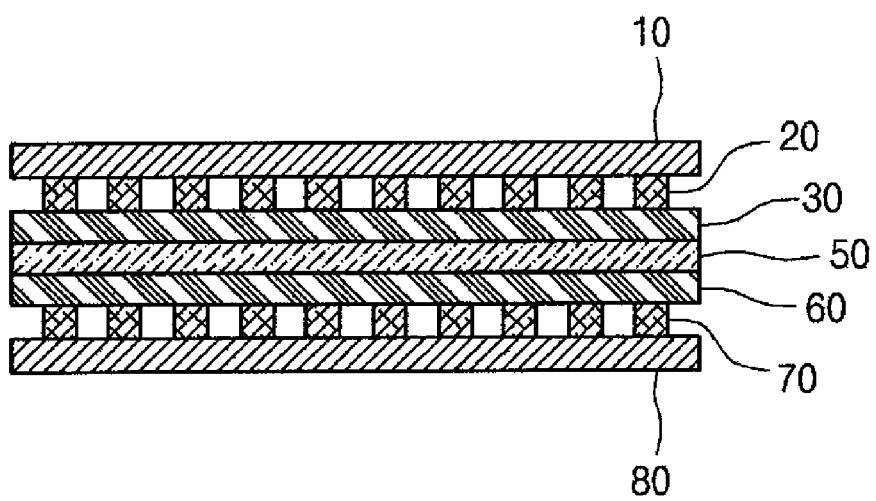
FIG. 2 is a diagram showing the construction of a unit cell of a molten carbonate fuel cell to which an air electrode, manufactured using a method of manufacturing the electrolyte-filled cathode of a molten carbonate fuel cell according to an embodiment of the present invention, is applied.

Referring to FIG. 2, a unit fuel cell, in which an air electrode 30, manufactured using the method of manufacturing the electrolyte-filled cathode of a molten carbonate fuel cell according to the embodiment of the present invention, is provided, includes a fuel electrode 60 in which hydrogen donates electrons while being oxidized, an air electrode 30 in which oxygen consumes electrons while being reduced, and a matrix 50 that promotes the exchange of ions between the air electrode 30 and the fuel electrode 60. The unit fuel cell further includes an air electrode current collecting plate gas passage 20 that forms passages for gas supplied to the air electrode 30, an air electrode current collecting plate 10 that captures charges generated in the air electrode 30, a fuel electrode current collecting plate gas passage 70 that forms passages for gas supplied to the fuel electrode 60, and a fuel electrode current collecting plate 80 that captures charges generated in the fuel electrode 60.

Figure 1:
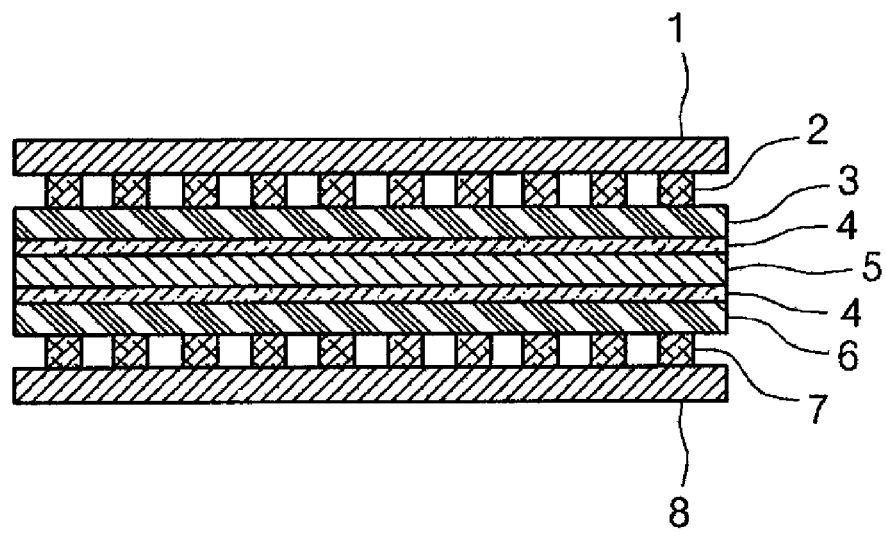
FIG. 1 is a diagram showing the construction of a prior art molten carbonate unit fuel cell.

The unit cell of the fuel cell of FIG. 2 does not include the electrolyte plates 4 (see FIG. 1) that are included in the unit cell of the prior art fuel cell, which is shown in FIG. 1. The reason for this is that electrolytes fill the air electrode 20 and are then heat-treated. Accordingly, even though a stack is formed by stacking several tens or hundreds of unit cells of the fuel cell of FIG. 2 and then heat treatment is applied thereto, the height of the stack does not vary, and necessary amounts of electrolyte are uniformly transferred from the electrolyte-filled air electrode 30 to the matrix 50 and the fuel electrode 60. As a result, the variation in the thickness of the unit cell of a fuel cell and a non-uniform surface pressure distribution, which are the problems of the prior art, occur while the electrolyte plate is melted.

Among the elements of the unit cell of the fuel cell shown in FIG. 2, the air electrode current collecting plate 10, the air electrode current collecting plate gas passage 20, the fuel electrode current collecting plate gas passage 70, and the fuel electrode current collecting plate 80 are elements included in the unit cell of a typical fuel cell, therefore detailed descriptions thereof are omitted here. The technical spirit of the present invention resides in a method of filling the air electrode 30 with necessary electrolytes in advance in a method of manufacturing the unit cell of the fuel cell, therefore parts related to the method are described in detail below.

The method of manufacturing the electrolyte-filled air electrode of the molten carbonate fuel cell according to an embodiment of the present invention includes four steps: a first step of manufacturing an air electrode through a sintering process, a second step of uniformly dispersing electrolytes, which are manufactured in a powder form according to the composition of eutectics, throughout one surface of the air electrode, a third step of attaching the electrolyte powder to the air electrode using pressure by pressing the electrolyte powder, dispersed throughout the surface of the air electrode, at a certain pressure, and a fourth step of filling the air electrode with the electrolyte powder, attached to the air electrode, through heat treatment. Methods necessary for the above-described respective steps and the use of apparatuses necessary to perform the respective methods are described in detail below with reference to FIGS. 3 to 6.

The term 'sintering process' refers to a process of causing solid powder to form a lump by putting solid powder in a certain frame, appropriately pressing the solid powder using a press, and heating the solid powder at a temperature close to the melting point of the solid powder, thereby causing the solid powder to be deposited on each other or bonded together at the contact surfaces thereof. The sintering process is a process that is suitable for the production of a solid having appropriate gaps, and is the same as a general sintering process. The air electrode 30 is manufactured in advance through such a sintering process.

Figure 3:
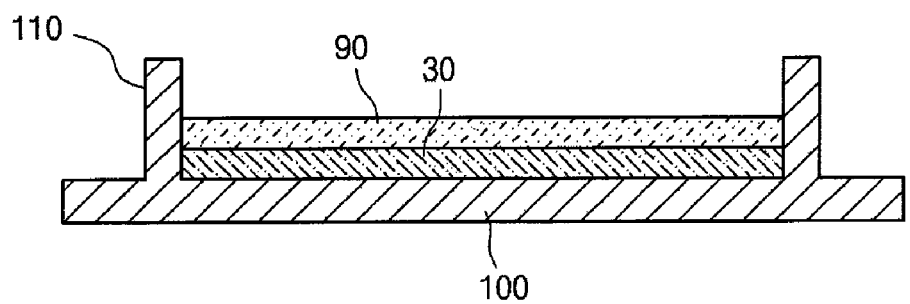
FIG. 3 is a schematic diagram showing a method of dispersing electrolytes in the manufacturing method according to the embodiment of the present invention.

Referring to FIG. 3, electrolytes 90, formed in a powder form according to the composition of eutectics, are uniformly dispersed throughout one surface of the air electrode 30, manufactured through the sintering process. The electrolytes 90 are layered on the surface of the air electrode 30 to thus have a uniform thickness.

The 'composition of eutectics' is preferably the eutectic composition of lithium carbonate $Li_2CO_3$ and potassium carbonate $K_2CO_3$, or the eutectic composition of lithium carbonate $Li_2CO_3$ and sodium carbonate $Na_2CO_3$. The ratio of respective components may be set by a designer in consideration of the amount of electrolyte.

It is preferred that the electrolyte powder 90 have an appropriate diameter so as to be well bonded to the air electrode 30. Here, it is preferred that the diameter of the electrolyte powder 90 be less than 10 micrometers. Furthermore, impurities are removed from the electrolyte powder 90, mixed according to the composition of eutectics, while the electrolyte powder is maintained in a vacuum furnace at a temperature higher than 200° at a pressure of about 10-2 torr, and then the electrolyte powder 90 free from impurities is used.

In order to uniformly disperse the electrolyte powder 90 throughout one surface of the air electrode 30, the air electrode must be secured at a certain location. Accordingly, the air electrode 30, as shown in FIG. 3, is secured using a graphite support plate 100, which allows the air electrode 30 to be placed thereon, and a graphite jig 110, which vertically and continuously extends from two side end portions of the graphite support plate 100 and fastens two side ends of the air electrode 30.

The graphite support plate 100 functions to support the air electrode 30 when the air electrode 30 is placed on the graphite support plate 100, and the graphite jig 110 functions to prevent the air electrode 30 from moving away from the graphite support plate 100. Furthermore, using the graphite support plate 100 and the graphite jig 110, the electrolyte powder 90, dispersed to the air electrode 30, can be prevented from moving away from one surface of the air electrode 30, and the electrolyte powder 90 is allowed to be uniformly dispersed throughout the surface of the air electrode 30.

Figure 4:
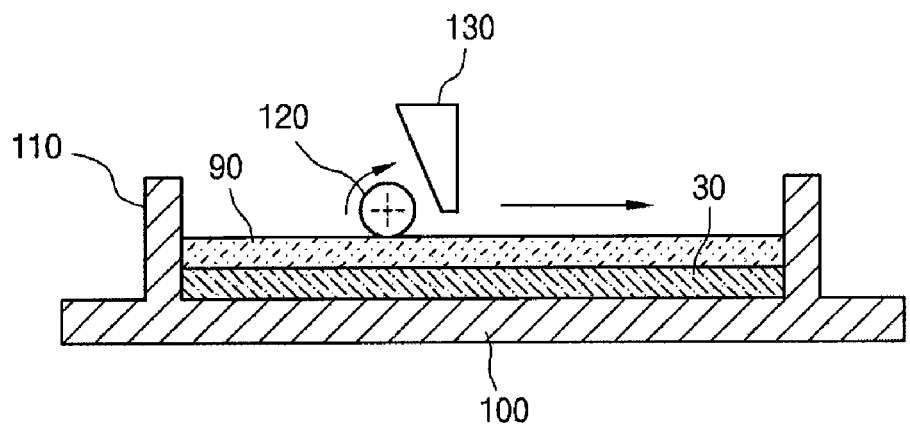
FIG. 4 is a schematic diagram showing a method of improving the property of bonding of electrolytes to the air electrode in the manufacturing method according to the embodiment of the present invention.
Figure 5:
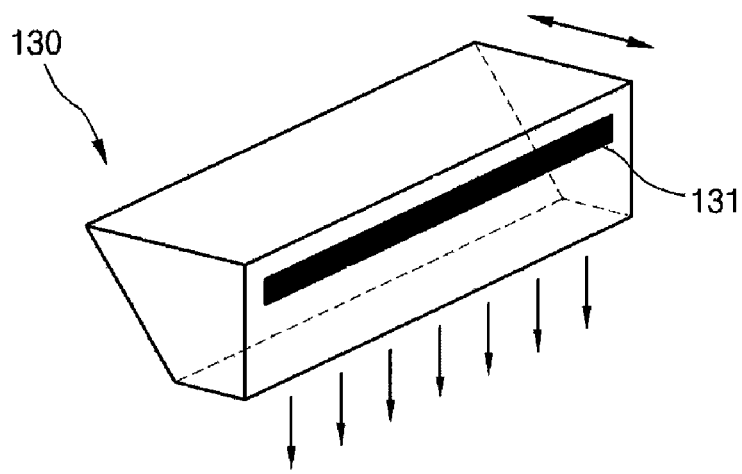
FIG. 5 is a schematic diagram showing a dispersion apparatus for dispersing the electrolyte powder of FIG. 3 throughout the air electrode.

It is preferable to use the dispersion apparatus 130 shown in FIGS. 4 and 5 in the method of dispersing the electrolyte powder 90 throughout one surface of the air electrode 30.

A vibrator 131 is installed in the dispersion apparatus 130 and generates vibrations at uniform intervals. Furthermore, the electrolyte powder 90 is put into the dispersion apparatus 130, and an exit (not shown), through which the electrolyte powder 90 can be discharged, is formed through the bottom surface of the dispersion apparatus 130, therefore the dispersion apparatus 130 discharges the electrolyte powder 90 while generating vibrations (refer to the downward arrows of FIG. 5).

Furthermore, the dispersion apparatus 130 disperses the electrolyte powder 90 on one surface of the air electrode while moving from one end of the air electrode 30 to the other end thereof. It is preferred that the dispersion apparatus 130 be located at an appropriate location above one surface of the air electrode 30. Although not shown in the drawing, it is preferred that the dispersion apparatus 130 be combined with guide rails on one surface of the air electrode 30 and move along one surface of the air electrode 30.

In FIGS. 4 and 5, the dispersion apparatus 130 is schematically illustrated. Since the elements of the dispersion apparatus 130 are typical, detailed descriptions thereof are omitted here. The reason for this is that the technical spirit of the present invention resides in the method of uniformly dispersing the electrolyte powder 90 through the movement and vibration of the dispersion apparatus 130.

Referring to FIG. 4 again, the electrolyte powder 90, uniformly dispersed throughout one surface of the air electrode 30 through the dispersion apparatus 130, is pressed again on the air electrode 30 by a pressing roller 120, so that the electrolyte powder 90 is well bonded to the air electrode 30. The pressing roller 120 is also illustrated schematically in FIG. 4. The pressing roller 120 may be a manual type pressing roller or an automatic type pressing roller, which is combined with guide rollers and is operated using a motor.

Although not shown in the drawing, a graphite plate having a predetermined weight is placed on the electrolyte powder 90 dispersed throughout one surface of the air electrode so as to apply a certain pressure to the electrolyte powder 90 pressed on the air electrode 30 through the pressing roller 120. The graphite plate additionally presses the electrolyte powder 90 on the air electrode 30, and heat treatment is performed the a state in which the graphite plate is placed on the electrolyte powder 90, therefore the removal of electrolyte powder 90 from the air electrode 30 is prevented by the pressure of reduction gas generated at the time of heat treatment. It is preferred that the graphite plate be the same size as, or be somewhat larger than, the air electrode 30. In any case, the graphite plate must cover all of the overall electrolyte powder 90 that is dispersed throughout one surface of the air electrode 30. It is preferred that the graphite plate have a density ensuring a predetermined weight, and have a thickness of about 10 mm.

In a state in which the graphite plate is placed, the air electrode 30, throughout which the electrolyte powder 90 is dispersed, is put into a continuous furnace (not shown) for heat treatment, with the air electrode 30 being secured by the graphite support plate 100 and the graphite jig 110. Through the heat treatment, the electrolyte powder 90, pressed on the surface of the air electrode 30, is melted and the molten electrolyte powder 90 fills the air electrode 30, in a reducing atmosphere within a heat treatment furnace (not shown) at a temperature ranging from 550° to 650°. Reduction gas (a mixture gas of hydrogen and nitrogen) is injected into a heat treatment furnace.

Since the porosity of the air electrode 30 formed through the sintering process generally ranges from 75% to 78%, it is preferred that the thickness of the air electrode 30 be larger than 0.8 mm so as to fill 80% or more of the volume of all of the pores with electrolytes.

Figure 6:
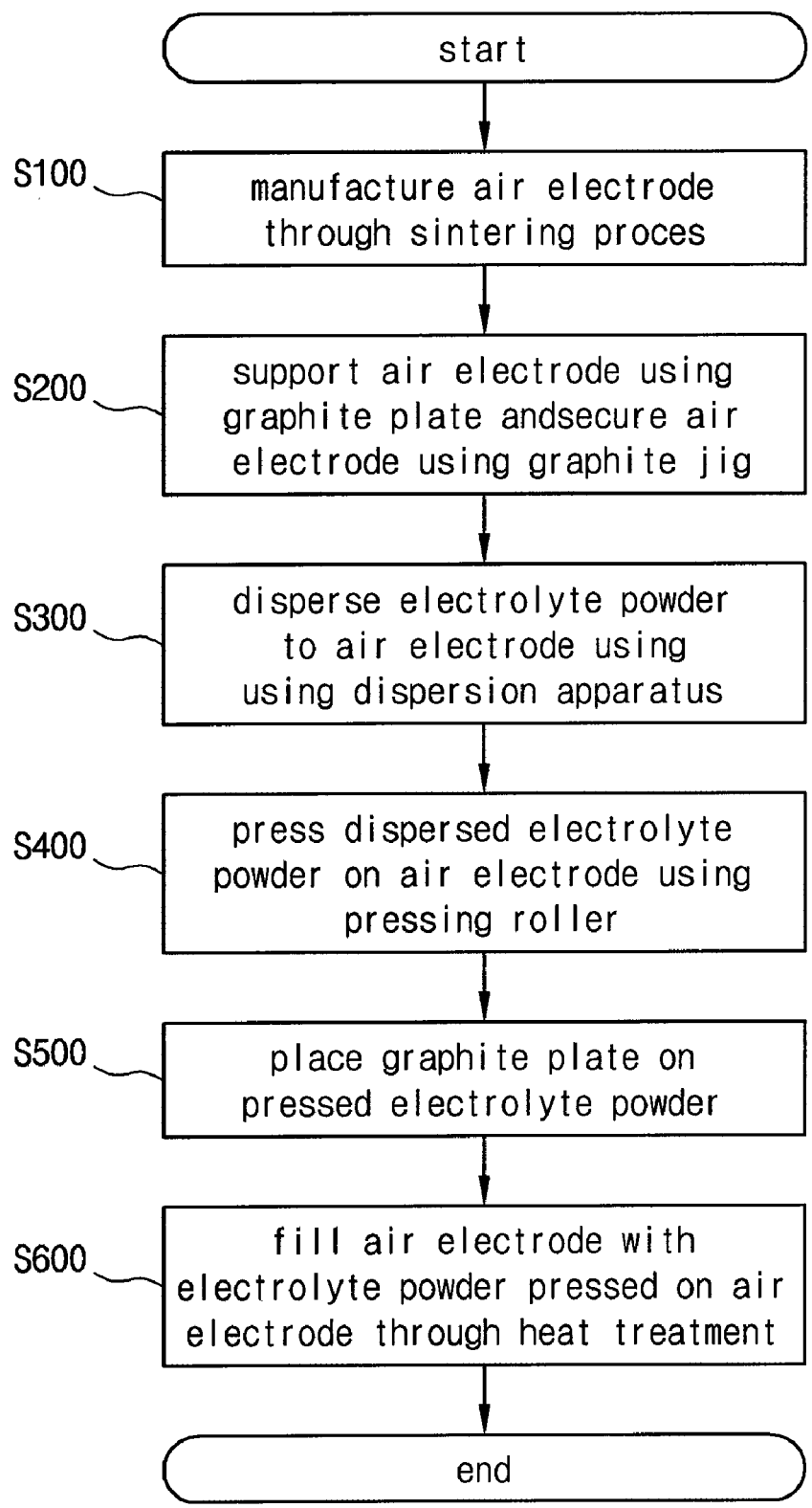
FIG. 6 is a flowchart showing the method of manufacturing the electrolyte-filled cathode of a molten carbonate fuel cell according to the embodiment of the present invention.

Referring to FIG. 6, the steps of the method of manufacturing the electrolyte-filled air electrode of the molten carbonate fuel cell according to the embodiment of the present invention are described below.

The air electrode 30 is manufactured through the above-described sintering process at step S100. The graphite support plate 100 is placed on the air electrode 30 and the air electrode 30 is secured using the graphite jig 110 at step S200. The electrolyte powder is uniformly dispersed throughout one surface of the air electrode 30 using the dispersion apparatus 130 at step S300. The electrolyte powder 90, dispersed throughout one surface of the air electrode 30, is pressed on the air electrode 30 using the pressing roller 120 at step S400.

The graphite plate is placed on the pressed electrolyte powder 90 at step S500, and the graphite plate and the electrolyte powder 90 are put into a heat treatment furnace, so that the air electrode 30 is filled with the electrolyte powder 90 pressed on the air electrode 30 at step S600.

Using the method of manufacturing the electrolyte-filled air electrode of the molten carbonate fuel cell according to the embodiment of the present invention, an air electrode 30 that has excellent flatness, thanks to uniform electrolyte distribution, and that has no twisting can be manufactured.

According to the method of manufacturing the electrolyte-filled cathode of a molten carbonate fuel cell according to the embodiment of the present invention, electrolyte plates are not used, therefore the variation in the height of a molten carbonate fuel cell stack is not caused, with the result that a uniform surface pressure distribution can be achieved, and therefore mechanical stability can be ensured. Furthermore, since electrolytes with which the air electrode is filled suffice for electrolytes required for respective elements, instability can be removed at the time of stacking unit cells. Furthermore, electrolytes can be uniformly and slowly dispersed in a process of increasing temperature to an operating temperature, therefore high performance can be achieved. Moreover, since organic material is not added, a separate process of removing the organic material is not necessary, therefore continuous processing can be performed in a continuous furnace having a reducing atmosphere, and a twisting phenomenon, occurring in a cooling process, can be minimized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing an electrolyte-filled cathode of a molten carbonate fuel cell, comprising the steps of:
   a) manufacturing an air electrode through a sintering process;
   b) dispersing electrolyte powder throughout one surface of the air electrode according to a composition of eutectics;
   c) attaching the electrolyte powder, uniformly dispersed throughout the one surface of the air electrode, to the air electrode using pressure by pressing the electrolyte powder on the air electrode at a predetermined pressure; and
   d) filling the air electrode with the electrolyte powder, attached to the air electrode, through heat treatment, wherein the step b) comprises the step of:
   b1) securing the air electrode using a graphite support plate, which allows the air electrode to be placed thereon, and a graphite jig, which vertically and continuously extends from two side end portions of the graphite support plate and fastens two side ends of the air electrode, so as to secure the air electrode at a predetermined location and prevent removal of the dispersed electrolytes from the one surface of the air electrode during the dispersion of the electrolyte powder; and
   b2) dispersing the electrolyte powder through a dispersion apparatus for generating vibrations using a vibrator and uniformly dispersing the electrolyte powder throughout the one surface of the air electrode while moving from one end of the air electrode to another end thereof above the one surface of the air electrode, so as to disperse the electrolyte powder, wherein the step c) comprises the step of:
   c1) pressing the electrolyte powder on the one surface of the air electrode using a pressing roller, and
   c2) placing a graphite plate having a predetermined weight on the electrolyte powder, dispersed throughout the one surface of the air electrode, so as to apply a predetermined pressure to the electrolyte powder attached to the one surface of the air electrode, wherein the size of the graphite plate is same as, or larger than, the air electrode so as to cover all of the overall electrolyte powder that is dispersed throughout one surface of the air electrode so as to prevent the removal of electrolyte powder from the air electrode by the pressure of reduction as generated at the time of heat treatment.

2. The method as set forth in claim 1, wherein the step d) comprises the step of:
   d1) melting the electrolyte powder pressed on the one surface of the air electrode and filling the air electrode with the electrolyte powder, in a reducing atmosphere within a heat treatment furnace at a temperature ranging from 550° to 650°.

3. The method as set forth in claim 1, wherein the electrolyte powder has a diameter equal to or smaller than 10 μm, and any of a composition of lithium carbonate and potassium carbonate and a composition of lithium carbonate and sodium carbonate.

4. The method as set forth in claim 1, wherein the air electrode has a thickness equal to or larger than 0.8 mm.

* * * * *